US009647584B2

(12) United States Patent
Katayama et al.

(10) Patent No.: US 9,647,584 B2
(45) Date of Patent: May 9, 2017

(54) MOTOR DRIVE CONTROLLER AND CONTROL METHOD OF MOTOR DRIVE CONTROLLER

(71) Applicant: MINEBEA CO., LTD., Kitasaku-gun, Nagano (JP)

(72) Inventors: Keiichi Katayama, Yonago (JP); Tomohiro Inoue, Yonago (JP)

(73) Assignee: Minebea Co., Ltd., Nagano (JP)

(*) Notice: Subject to any disclaimer, the term of this patent is extended or adjusted under 35 U.S.C. 154(b) by 0 days.

(21) Appl. No.: 14/926,409

(22) Filed: Oct. 29, 2015

(65) Prior Publication Data
US 2016/0126870 A1    May 5, 2016

(30) Foreign Application Priority Data

Oct. 30, 2014  (JP) ................. 2014-221003

(51) Int. Cl.
| H02P 1/46 | (2006.01) |
|---|---|
| H02P 1/50 | (2006.01) |
| H02P 3/18 | (2006.01) |
| H02P 6/00 | (2016.01) |
| H02P 23/00 | (2016.01) |
| H02P 25/00 | (2006.01) |
| H02P 27/00 | (2006.01) |
| H02P 6/08 | (2016.01) |
| H02P 25/022 | (2016.01) |
| H02P 1/52 | (2006.01) |
| H02P 6/06 | (2006.01) |

(52) U.S. Cl.
CPC ............ H02P 6/08 (2013.01); H02P 6/085 (2013.01); H02P 1/46 (2013.01); H02P 1/52 (2013.01); H02P 6/06 (2013.01); H02P 25/022 (2013.01)

(58) Field of Classification Search
CPC .... H02P 25/022; H02P 25/023; H02P 25/021; H02P 1/46; H02P 1/52
USPC .......................................... 318/723
See application file for complete search history.

(56) References Cited

U.S. PATENT DOCUMENTS

| 6,114,818 A * | 9/2000 | Ohtsubo .................. H02N 2/14 |
| | | 318/114 |
| 2006/0087263 A1* | 4/2006 | Sa ......................... D06F 37/304 |
| | | 318/66 |

(Continued)

FOREIGN PATENT DOCUMENTS

JP    2014-036571 A    2/2014

Primary Examiner — Kawing Chan
Assistant Examiner — Bradley Brown
(74) Attorney, Agent, or Firm — Carrier Blackman & Associates, P.C.; Joseph P. Carrier; Jeffrey T. Gedeon

(57) ABSTRACT

A motor drive controller includes: a control circuit unit configured to output a drive control signal for driving a motor in response to a command signal externally input to the control circuit unit; and a motor driving unit configured to output a drive signal to the motor based on the drive control signal output from the control circuit unit. The control circuit unit is provided with: a speed setting unit configured to generate a target rotation speed signal corresponding to a target rotation speed based on a command step determined in response to a step command signal and predetermined setting information when the step command signal is input as the command signal; and a drive control signal generating unit configured to generate and output the drive control signal based on the target rotation speed signal.

10 Claims, 9 Drawing Sheets

(56) References Cited

U.S. PATENT DOCUMENTS

2013/0170951 A1* 7/2013 Sato .................. H02P 6/06
　　　　　　　　　　　　　　　　　　　415/1
2014/0046487 A1　 2/2014 Gu \* cited by examiner

MOTOR DRIVE CONTROLLER AND CONTROL METHOD OF MOTOR DRIVE CONTROLLER

BACKGROUND OF THE INVENTION

1. Field of the Invention

The present invention relates to a motor drive controller and a control method of the motor drive controller, and more particularly, to a motor drive controller that controls a rotation speed of a motor based on an external input signal and a control method of the motor drive controller.

2. Description of the Related Art

A method of controlling a rotation speed of a motor (for example, a brushless DC motor which is used as a fan motor or a motor of an electric fan) using a motor drive controller is known in which an external command signal is input and the rotation speed of the motor is controlled based on the command signal. An example of the command signal is a pulse-width modulation (PWM) signal and a rotation speed of a motor is controlled based on a duty ratio of the PWM signal.

An example of such configuration is disclosed in JP-A-2014-036571. The publication JP-A-2014-036571 discloses a configuration of a motor speed controller that controls a motor by setting an actual rotation speed based on a target speed that is externally input.

The controller described in JP-A-2014-036571 may have the following problems. That is, a target rotation speed is designated by inputting a command signal such as a clock signal or a PWM signal that is externally input to the motor speed controller. An equipment manufacturer who mounts the motor speed controller on equipment may need to input a command signal to the motor speed controller such that the motor operates at a target rotation speed depending on specifications or settings of the equipment. When the target rotation speed of the motor is changed, the equipment manufacturer may need to change the command signal. However, the configuration for inputting the command signal to the motor speed controller may not be easily configured.

As a solution to this problem, for example, use of a command signal (for example, a high/low-combined signal) capable of easily changing the target rotation speed can be considered unlike the configuration described in JP-A-2014-036571. The target rotation speed can be changed in a simple method using such a signal. However, in using such a signal, the number of signal patterns which can be used to set the target speed, and the like, is relatively small. Accordingly, there may be a problem in that a range in which the target rotation speed can be changed is narrow (the degree of freedom is low).

SUMMARY

The present invention is made to solve the above-mentioned problems and one of objects of the present invention is to provide a motor drive controller that can simplify an externally input command signal, easily change the setting of a target rotation speed using a command signal, and has a high degree of freedom in setting the target rotation speed and a control method of the motor drive controller.

According to an illustrative embodiment of the present invention, there is provided a motor drive controller including: a control circuit unit configured to output a drive control signal for driving a motor in response to a command signal externally input to the control circuit unit; and a motor driving unit configured to output a drive signal to the motor based on the drive control signal output from the control circuit unit. The control circuit unit is provided with: a speed setting unit configured to generate a target rotation speed signal corresponding to a target rotation speed based on a command step determined in response to a step command signal and predetermined setting information when the step command signal is input as the command signal; and a drive control signal generating unit configured to generate and output the drive control signal based on the target rotation speed signal.

According to another illustrative embodiment of the present invention, there is provided a motor drive controller including: a control circuit unit configured to output a drive control signal for driving a motor in response to a command signal externally input to the control circuit unit; and a motor driving unit configured to output a drive signal to the motor based on the drive control signal output from the control circuit unit. The control circuit unit is provided with: a first signal path through which a step command signal for performing control of stepwise designating a rotation speed of the motor is input as the command signal; and a second signal path through which a rotation speed command signal corresponding to a target rotation speed of the motor is input as the command signal. The control circuit unit is configured to generate and output the drive control signal based on the input signal when at least one of the step command signal and the rotation speed command signal is input.

According to a still another illustrative embodiment of the present invention, there is provided a control method of a motor drive controller including: a control circuit unit configured to output a drive control signal for driving a motor in response to a command signal externally input to the control circuit unit; and a motor driving unit configured to output a drive signal to the motor based on the drive control signal output from the control circuit unit. The control method includes: receiving an input of a step command signal for performing stepwise control to set a rotation speed of the motor as the command signal to the control circuit unit; receiving an input of a rotation speed command signal corresponding to a target rotation speed of the motor as the command signal to the control circuit unit; and generating and outputting the drive control signal based on the step command signal or the rotation speed command signal when at least one of the step command signal and the rotation speed command signal is received.

According to the configurations of the illustrative embodiments, a target rotation speed signal is generated based on the determined command step determined based on the input step command signal and the predetermined setting information and a drive control signal is generated based on the generated target rotation speed signal. Therefore, it is possible to provide a motor drive controller that can simplify an input of a command signal from the outside, easily change setting of a target rotation speed using a command signal, and have a high degree of freedom in setting the target rotation speed and a control method of the motor drive controller.

DETAILED DESCRIPTION

Hereinafter, motor drive controllers according to embodiments of the invention will be described.

First Embodiment

Figure 1:
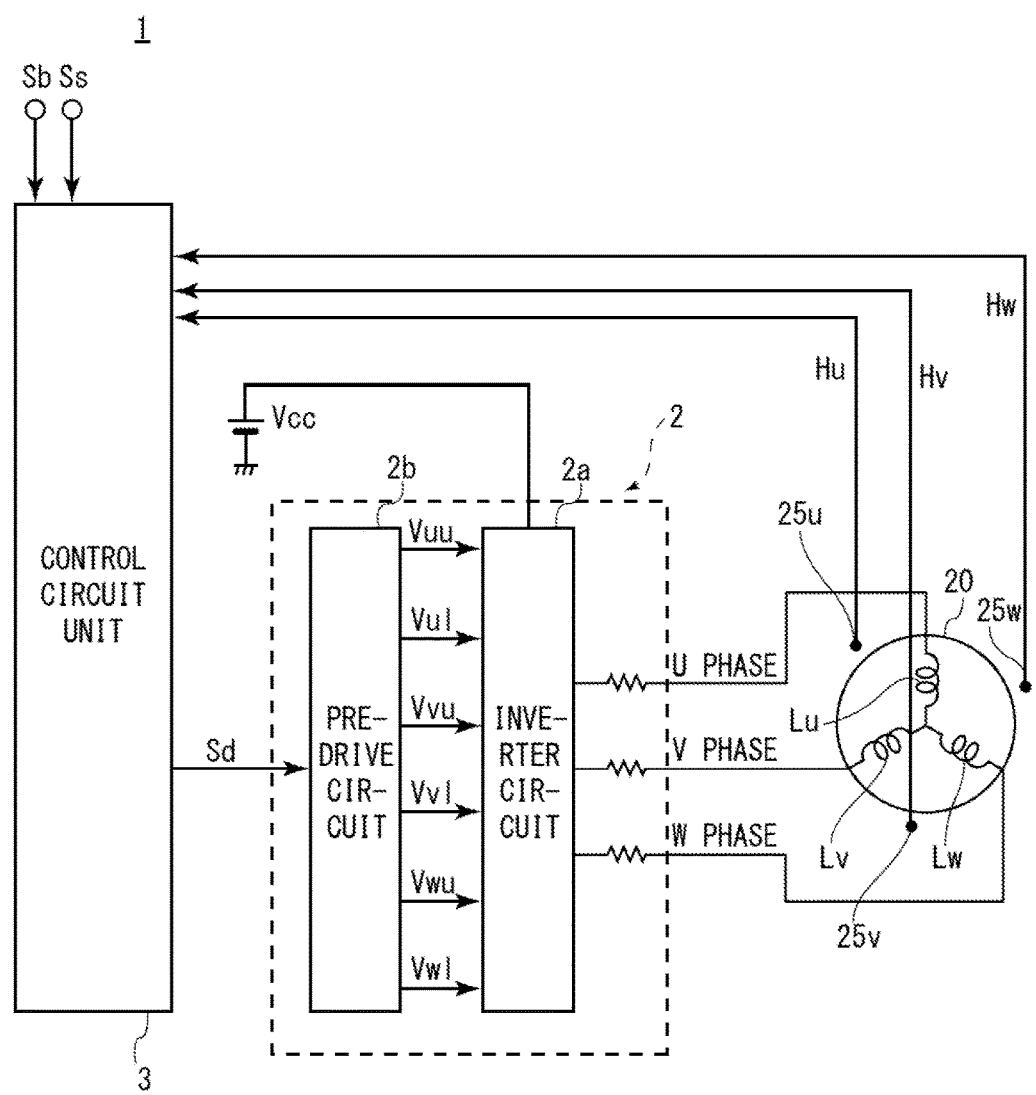
FIG. 1 is a diagram illustrating a circuit configuration of a motor drive controller according to a first embodiment of the invention.

FIG. 1 is a diagram illustrating a circuit configuration of a motor drive controller 1 according to a first embodiment of the invention.

As illustrated in FIG. 1, the motor drive controller 1 is configured to drive a brushless motor 20 (hereinafter, simply referred to as a motor 20), for example, by sine wave drive. In this embodiment, the motor 20 is, for example, a three-phase brushless motor. The motor drive controller 1 rotates the motor 20 by outputting a sine-wave drive signal to the motor 20 to cause a sinusoidal drive current to periodically flow in armature coils Lu, Lv, and Lw of the motor 20.

The motor drive controller 1 is provided with a motor drive unit 2 including an inverter circuit 2a and a pre-drive circuit 2b and a control circuit unit 3. The components of the motor drive controller 1 illustrated in FIG. 1 may be only a part of the motor drive controller 1, and the motor drive controller 1 may further be provided with other components in addition to those illustrated in FIG. 1 and described in below.

In this embodiment, the motor drive controller 1 is configured as an integrated circuit device IC which is incorporated into a package as a whole. A part of the motor drive controller 1 may be incorporated into a package as a single integrated circuit device or a part or all of the motor drive controller 1 along with another unit may be incorporated into a package to form a single integrated circuit device.

The inverter circuit 2a and the pre-drive circuit 2b are provided in the motor drive unit 2. The inverter circuit 2a outputs a drive signal to the motor 20 based on an output signal output from the pre-drive circuit 2b and supplies a current to the armature coils Lu, Lv, and Lw of the motor 20. The inverter circuit 2a has, for example, a configuration in which a pair of series circuits of two switching elements formed at both ends of a DC power source Vcc is disposed for each phase (a U phase, a V phase, and a W phase) of the armature coils Lu, Lv, and Lw. In each pair of two switching elements, each phase terminal of the motor 20 is connected to a connecting point between the switching elements.

The pre-drive circuit 2b generates an output signal for driving the inverter circuit 2a under the control of the control circuit unit 3 and outputs the generated output signal to the inverter circuit 2a. As the output signal, for example, six types of signals of Vuu, Vul, Vvu, Vvl, Vwu, and Vwl, which correspond to the switching elements of the inverter circuit 2a, are output. By outputting the output signals, the switching elements corresponding to the output signals are turned on and off and a drive signal is output to the motor 20 to supply power to the phases of the motor 20 (not illustrated).

Two external signals Ss and Sb are input to the control circuit unit 3. For example, a start signal Ss and a brake signal Sb are input as the two signals Ss and Sb. The start signal Ss is input from a start terminal (not illustrated) of the control circuit unit 3. The brake signal Sb is input from a brake terminal (not illustrated) of the control circuit unit 3.

The control circuit unit 3 controls driving of the motor 20 based on the two signals Ss and Sb. That is, the start signal Ss is a signal for setting whether to control the driving of the motor 20 or whether to enter a standby state in which the driving is not controlled. When a low signal is input as the start signal Ss, the control circuit unit 3 starts driving control of the motor 20. The brake signal Sb is a signal for controlling whether to activate the brake of the motor 20. When a high signal is input as the brake signal Sb, the control circuit unit 3 brakes the driving of the motor 20.

Three Hall signals Hu, Hv, and Hw are input to the control circuit unit 3 from the motor 20. The Hall signals Hu, Hv, and Hw are output, for example, from three Hall elements 25u, 25v, and 25w disposed in the motor 20. The control circuit unit 3 detects a rotational state of the motor 20 by acquiring information such as a rotational position or rotation number information (Hall FG signal) of the motor 20 using the Hall signals Hu, Hv, and Hw, and controls the driving of the motor 20.

The three Hall elements 25u, 25v, and 25w (hereinafter, also collectively referred to as Hall elements 25) are arranged around the rotor of the motor 20, for example, at substantially equal intervals (at intervals of 120 degrees). The Hall elements 25u, 25v, and 25w detect the magnetic pole of the rotor and output the Hall signals Hu, Hv, and Hw.

The control circuit unit 3 is configured to have other information on the rotational state of the motor 20 input thereto in addition to the Hall signals Hu, Hv, and Hw. For example, a signal (pattern FG) which is generated using a coil pattern formed on a circuit board located on the rotor side is input as an FG signal corresponding to the rotation of the rotor of the motor 20. The rotational state of the motor 20 may be detected based on a detection result of a rotational position detecting circuit detecting a counter-electromotive voltage caused in the phases (U, V, W phases) of the motor 20, or an encoder or a resolver or the like may be formed to detect information such as the rotation speed of the motor 20.

The control circuit unit 3 is configured, for example, by a microcomputer or the like. The control circuit unit 3 outputs a drive control signal Sd to the pre-drive circuit 2b based on the Hall signals Hu, Hv, and Hw and two signals Ss and Sb input from the outside. The control circuit unit 3 controls the rotation of the motor 20 by outputting the drive control signal Sd for driving the motor 20 to the motor driving unit 2 to control the motor driving unit 2. The motor driving unit 2 outputs a sine-wave drive signal to the motor 20 to drive the motor 20 based on the drive control signal Sd.

In this embodiment, two terminals of a start terminal and a brake terminal of the control circuit unit 3 are commonly used as input terminals of the step command signals Ss and Sb. The step command signals Ss and Sb are command signals for performing stepwise control to set the rotation speed of the motor 20 (for example, set the rotation speed of the motor 20 to 100 rpm, 200 rpm, 300 rpm and the like). The step command signals Ss and Sb are classified into two signals of a step-up signal Ss and a step-down signal Sb. The step-up signal Ss and the step-down signal Sb are input to the control circuit unit 3 through different terminals connected to different signal lines.

When the driving of the motor 20 is started in a multistep operation mode as will be described later, a signal input to the start terminal is treated as the step-up signal Ss and a signal input to the brake terminal is treated as the step-down signal Sb. In this case, the control circuit unit 3 sets a target rotation speed inside the control circuit unit 3 based on the input step command signals Ss and Sb, and outputs the drive control signal Sd based on the target rotation speed. Accordingly, the control circuit unit 3 controls the rotation of the motor 20 such that the motor 20 rotates at the set target rotation speed.

Control Circuit Unit 3

Figure 2:
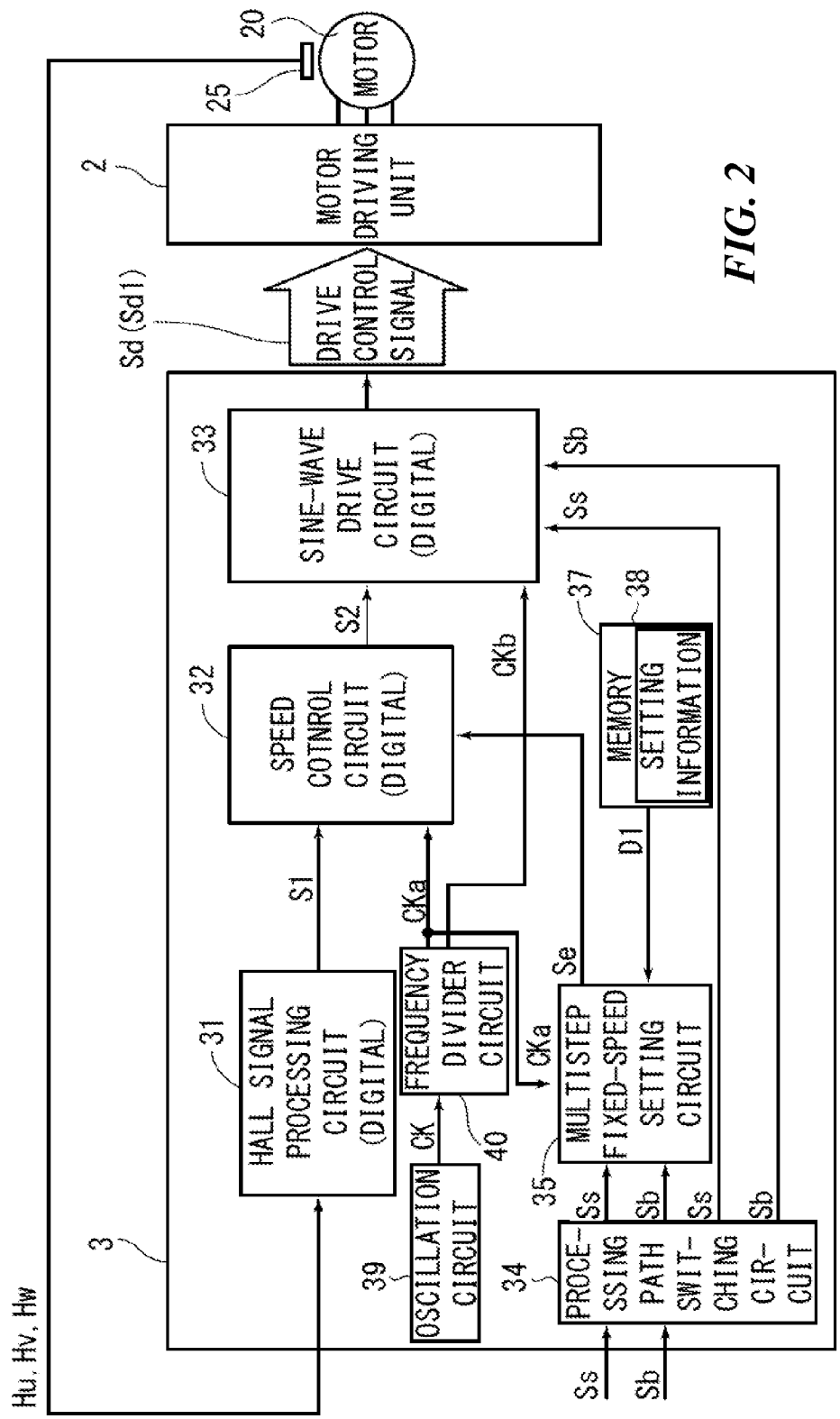
FIG. 2 is a block diagram illustrating a configuration of a control circuit unit according to the first embodiment.

FIG. 2 is a block diagram illustrating the configuration of the control circuit unit 3 according to the first embodiment.

As illustrated in FIG. 2, the control circuit unit 3 is provided with a Hall signal processing circuit 31, a speed control circuit 32, and a sine-wave drive circuit 33. The speed control circuit 32 and the sine-wave drive circuit 33 serve as a drive control signal generating unit. These circuits are digital circuits. The control circuit unit 3 is further provided with a processing path switching circuit 34, a multistep fixed-speed setting circuit (an example of the speed setting unit: hereinafter, also referred to as a speed setting circuit) 35, a memory 37, an oscillation circuit 39, and a frequency divider circuit 40. In FIG. 2, transmission of signals or information between the circuits is associated with generation of speed command information S2.

The Hall signals Hu, Hv, and Hw are input to the Hall signal processing circuit 31. The Hall signal processing circuit 31 generates and outputs a generated signal S1 based on the input Hall signals Hu, Hv, and Hw. The Hall signal processing circuit 31 may output a signal corresponding to the period of the generated signal S1 as a Hall period signal corresponding to the rotation speed of the motor 20.

The generated signal S1 output from the Hall signal processing circuit 31, the clock signal CKa output from the frequency divider circuit 40, and the target rotation speed signal Se output from the speed setting circuit 35 are input to the speed control circuit 32. The clock signal CKa is an operation clock of the speed control circuit 32. The target rotation speed signal Se is a signal (for example, a signal having a frequency corresponding to the target rotation speed) corresponding to the target rotation speed of the motor 20. The speed control circuit 32 outputs speed command information S2 based on the generated signal S1 and the target rotation speed signal Se. Specifically, for example, the speed control circuit 32 generates the speed command information S2 based on the target rotation speed signal Se and a rotation speed signal corresponding to the rotation of the motor 20 such that the rotation speed of the motor 20 corresponds to the target rotation speed signal Se. At this time, the speed control circuit 32 may perform advance-angle control to output the speed command information S2.

The speed control circuit 32 may operate in a non-control mode in which such control is not performed. In the non-control mode, the speed control circuit 32 may control the motor 20 by generating the unique speed command information S2 corresponding to the target rotation speed signal Se without depending on the rotation speed of the motor 20. Whether to operate in the control mode in which control based on the rotation speed of the motor 20 is performed and whether to operate in the non-control mode may be switched therebetween based on an external signal input to the control circuit unit 3, the setting information stored in the memory 37, or the like.

The speed command information S2 is input to the sine-wave drive circuit 33. The sine-wave drive circuit 33 generates the drive control signal Sd for driving the motor driving unit 2 based on the speed command information S2. By outputting the drive control signal Sd to the motor driving unit 2, a sine-wave drive signal is output from the motor driving unit 2 to the motor 20 and the motor 20 is driven. That is, the drive control signal Sd is generated based on the target rotation speed signal Se by the speed control circuit 32 and the sine-wave drive circuit 33 and is output to the motor driving unit 2.

The oscillation circuit 39 outputs a clock signal CK (for example, 40 MHz) as an operation clock to the frequency divider circuit 40.

The frequency divider circuit 40 outputs a clock signal CKa (for example 5 MHz) as an operation clock to the speed control signal 32. The frequency divider circuit 40 outputs a clock signal CKa (for example, 5 MHz) as a reference clock to the speed setting circuit 35. The frequency divider circuit 40 outputs a clock signal CKb (for example, 10 MHz) as an operation clock to the sine-wave drive circuit 33.

Two signals Ss and Sb are input to the processing path switching circuit 34. At this time, the processing path switching circuit 34 switches an output path of the two signals Ss and Sb when the signal Ss is a start signal Ss and the signal Sb is a brake signal Sb and when the signal Ss is a step-up signal Ss and the signal Sb is a step-down signal Sb.

This switching is performed, for example, depending on whether the operation mode of the control circuit unit 3 is a multistep operation mode. That is, when the operation mode is a multistep operation mode, two signals Ss and Sb are determined to be the step command signals Ss and Sb and the output path is switched. When the start signal Ss and the brake signal Sb are input, the processing path switching circuit 34 outputs the start signal Ss and the brake signal Sb to the sine-wave drive circuit 33. When the step-up signal Ss and the step-down signal Sb are input, the processing path switching circuit 34 outputs the step-up signal Ss and the step-down signal Sb to the speed setting circuit 35.

The memory 37 stores various set values used for the operation of the control circuit unit 3. The setting information 38 is stored in the memory 37. The setting information 38 is appropriately read by the speed setting circuit 35 (setting information D1).

Figure 3:
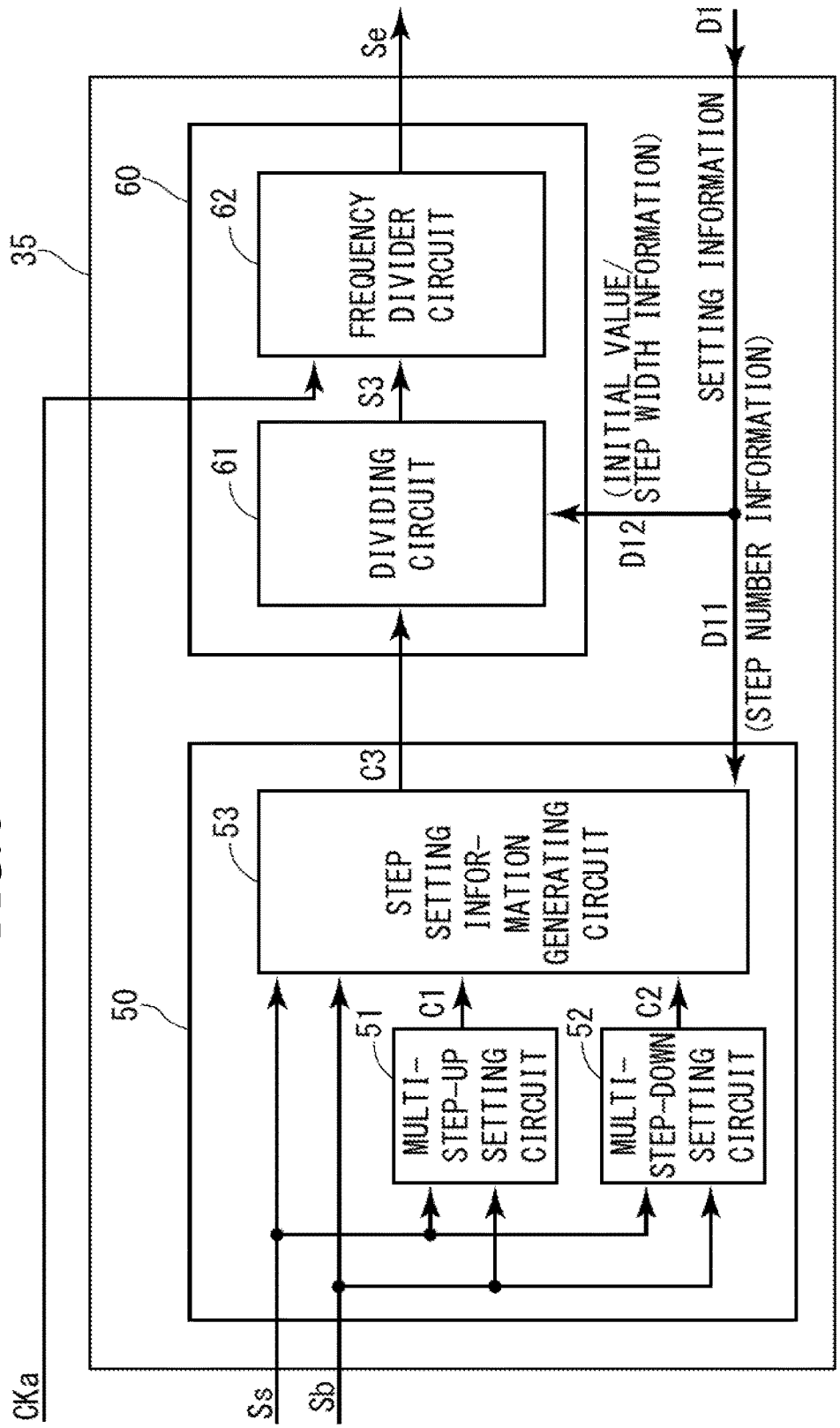
FIG. 3 is a diagram illustrating a circuit configuration of a multistep fixed-speed setting circuit according to the first embodiment.

FIG. 3 is a diagram illustrating the circuit configuration of the multistep fixed-speed setting circuit 35.

As illustrated in FIG. 3, the step command signals Ss and Sb via the processing path switching circuit 34, the setting information D1 read from the memory 37, and the clock signal CKa as a reference clock for frequency division are input to the speed setting circuit 35. The speed setting circuit 35 generates the target rotation speed signal Se based on the command step (the number of steps) determined based on the step command signals Ss and Sb and the predetermined setting information D1. In other words, the speed setting circuit 35 sets the target rotation speed based on the command step and the setting information D1 and generates the target rotation speed signal Se corresponding to the set target rotation speed.

The setting information D1 includes step number information D11 and step value information D12. The step number information D11 is information indicating the total number of steps (for example, distinction of three steps, five steps, and seven steps). The step value information D12 is information indicating an initial step value (for example, 200 Hz) denoting the value of an initial step and a step width value (for example, 100 Hz) denoting a width of one step.

The speed setting circuit 35 is mainly provided with a step setting information detecting circuit 50 and a target rotation speed generating circuit 60.

The step command signals Ss and Sb and the step number information D11 of the setting information D1 are input to the step setting information detecting circuit 50. The step setting information detecting circuit 50 outputs step setting information C3 generated based on the command step determined by the step command signals Ss and Sb.

The clock signal CKa output from the frequency divider circuit 40 and the step setting information C3 output from the step setting information detecting circuit 50 are input to the target rotation speed generating circuit 60. The step value information D12 indicating the initial step value and the step width in the setting information D1 is input to the target rotation speed generating circuit 60. The target rotation speed generating circuit 60 outputs the target rotation speed signal Se corresponding to the step setting information C3 based on the input signal or information.

The step setting information detecting circuit 50 is provided with, for example, a multistep-up setting circuit 51, a multistep-down setting circuit 52, and a step setting information generating circuit 53.

The step setting information generating circuit 53 is configured by, for example, an up-down counter. The step command signals Ss and Sb and the step number information D11 are input to the step setting information generating circuit 53. The step setting information generating circuit 53 generates a step setting information C3 based on the command step determined based on the step command signals Ss and Sb. The generated step setting information C3 is output from the step setting information generating circuit 53.

In this embodiment, a multistep change command is executed as will be described later by a multistep command setting unit which is configured by the multistep-up setting circuit 51 and the multistep-down setting circuit 52.

The multistep-up setting circuit 51 is a time counter. The step command signals Ss and Sb are input to the multistep-up setting circuit 51. When the step-up signal Ss is continuously input for a predetermined time period or longer, the multistep-up setting circuit 51 outputs a multistep-up signal C1. That is, the multistep-up setting circuit 51 counts an input duration time of the step-up signal Ss and outputs the multistep-up signal C1 depending on the input duration time. The multistep-up signal C1 is instruction information for simultaneously stepping up plural steps (multisteps).

The multistep-down setting circuit 52 is a time counter. The step command signals Ss and Sb are input to the multistep-down setting circuit 52. When the step-down signal Sb is continuously input for a predetermined time period or longer, the multistep-down setting circuit 52 outputs a multistep-down signal C2. The multistep-down setting circuit 52 counts an input duration time of the step-down signal Sb and outputs the multistep-down signal C2 depending on the input duration time. The multistep-down signal C2 is instruction information for simultaneously stepping down plural steps.

The multistep command signals C1 and C2 (the multistep-up signal C1 and the multistep-down signal C2) output from the multistep-up setting circuit 51 and the multistep-down setting circuit 52 are input to the step setting information generating circuit 53.

When the multistep-up signal C1 is input from the multistep-up setting circuit 51, the step setting information generating circuit 53 outputs the step setting information C3 for simultaneously stepping up plural steps accordingly.

When the multistep-down signal C2 is input from the multistep-down setting circuit 52, the step setting information generating circuit 53 outputs the step setting information C3 for stepping down plural steps accordingly.

The target rotation speed generating circuit 60 includes, for example, a dividing circuit 61 and a frequency division circuit 62.

The step setting information C3 and the step value information D12 are input to the dividing circuit 61. The dividing circuit 61 generates a frequency-division signal S3 based on the step setting information C3 and the step value information D12. The dividing circuit 61 calculates into what frequencies to divide the clock signal CKa in generating the target rotation speed signal Se from the subsequent frequency division circuit 62.

The frequency-division signal S3 output from the dividing circuit 61 and the clock signal CKa as a reference clock are input to the frequency division circuit 62. The frequency division circuit 62 generates and outputs the target rotation speed signal Se based on the frequency-division signal S3. For example, when the input clock signal CKa is 5 MHz, the target rotation speed signal Se of 200 Hz is generated by dividing the clock signal by 1/25,000.

Figure 4:
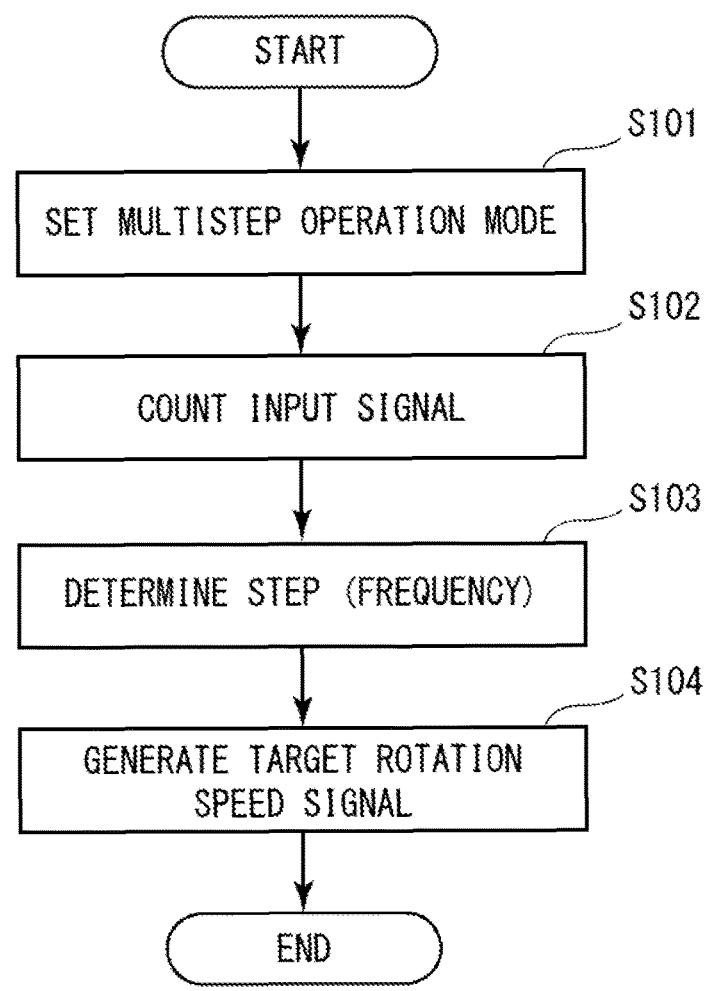
FIG. 4 is a flowchart illustrating an operation flow of the multistep fixed-speed setting circuit according to the first embodiment.

FIG. 4 is a flowchart illustrating an operation flow of the multistep fixed-speed setting circuit 35 according to the first embodiment.

The speed setting circuit 35 repeatedly performs the following operations.

As illustrated in FIG. 4, in step S101, the speed setting circuit 35 is set to operate in the multistep operation mode. That is, the setting information D1 is input based on the setting information 38 stored in the memory 37. Accordingly, the control circuit unit 3 operates in the multistep operation mode. Then, the setting information (the total number of steps, the value of the initial step, and the step width value of one step) to be used is determined.

In step S102, the step setting information generating circuit 53 counts the command step based on the input step-up signal Ss or step-down signal Sb (input signal). When the multistep command signals C1 and C2 are output, the command step is determined accordingly.

In step S103, the step setting information generating circuit 53 determines a step, that is, a frequency, based on the counted number. Then, the step setting information generating circuit 53 generates and outputs the step setting information C3 for designating the target rotation speed signal Se.

In step S104, the target rotation speed generating circuit 60 generates and outputs the target rotation speed signal Se corresponding to the output step setting information C3.

When the process of step S104 ends, a series of process ends.

In this embodiment, when the step command signals Ss and Sb are input, the output step setting information C3 is changed depending on the time (input duration time: also referred to as a press time (of a signal)) in which the input is kept.

Specifically, when the input duration time is less than a predetermined time (also referred to as a long press setting time) (when a short-press input is performed), the command step is changed by one step in response to the input of the step command signals Ss and Sb and the step setting information C3 is output in step S102.

On the other hand, when the input duration time is equal to or greater than the predetermined time (when a long-press, or press and hold input is performed), the command step is simultaneously changed by plural steps and the step setting information C3 is output. That is, in this case, the multistep command signal C1 or C2 is output from the multistep-up setting circuit 51 or the multistep-down setting circuit 52, and the step setting information generating circuit 53 outputs the step setting information C3 based thereon.

Figure 5:
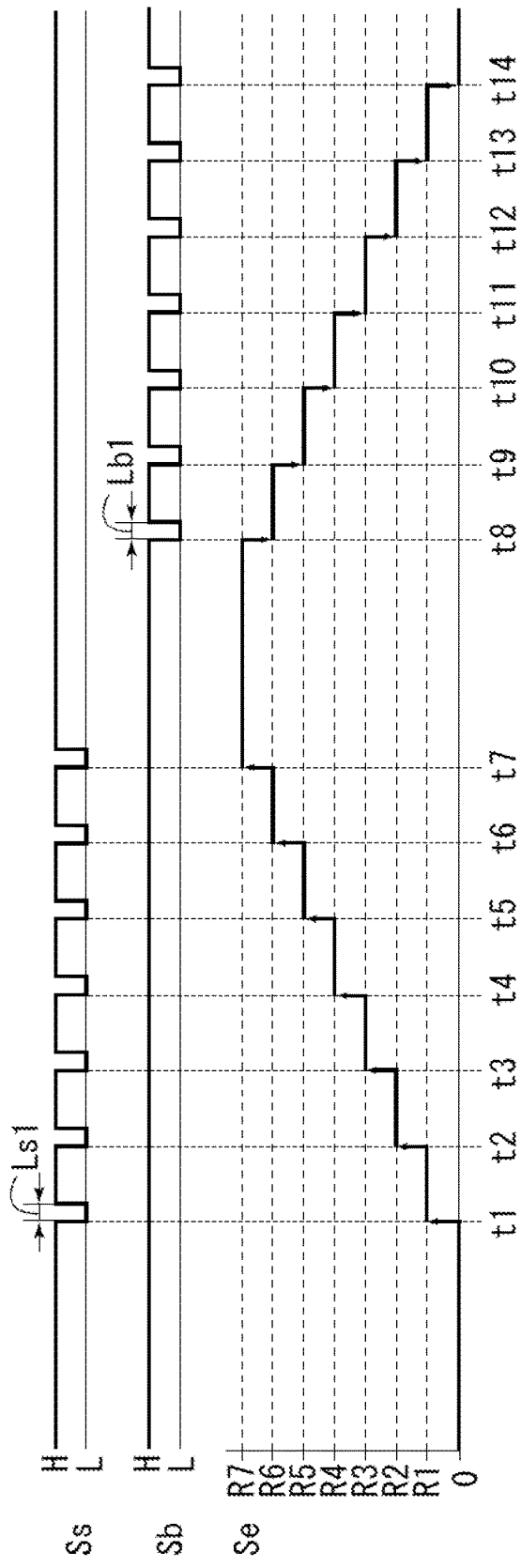
FIG. 5 is a diagram illustrating a target rotation speed signal output when an input duration time of a step command signal is less than a predetermined time.

FIG. 5 is a diagram illustrating the target rotation speed signal Se output when the input duration time of the step command signals Ss and Sb is less than a predetermined time.

Figure 6:
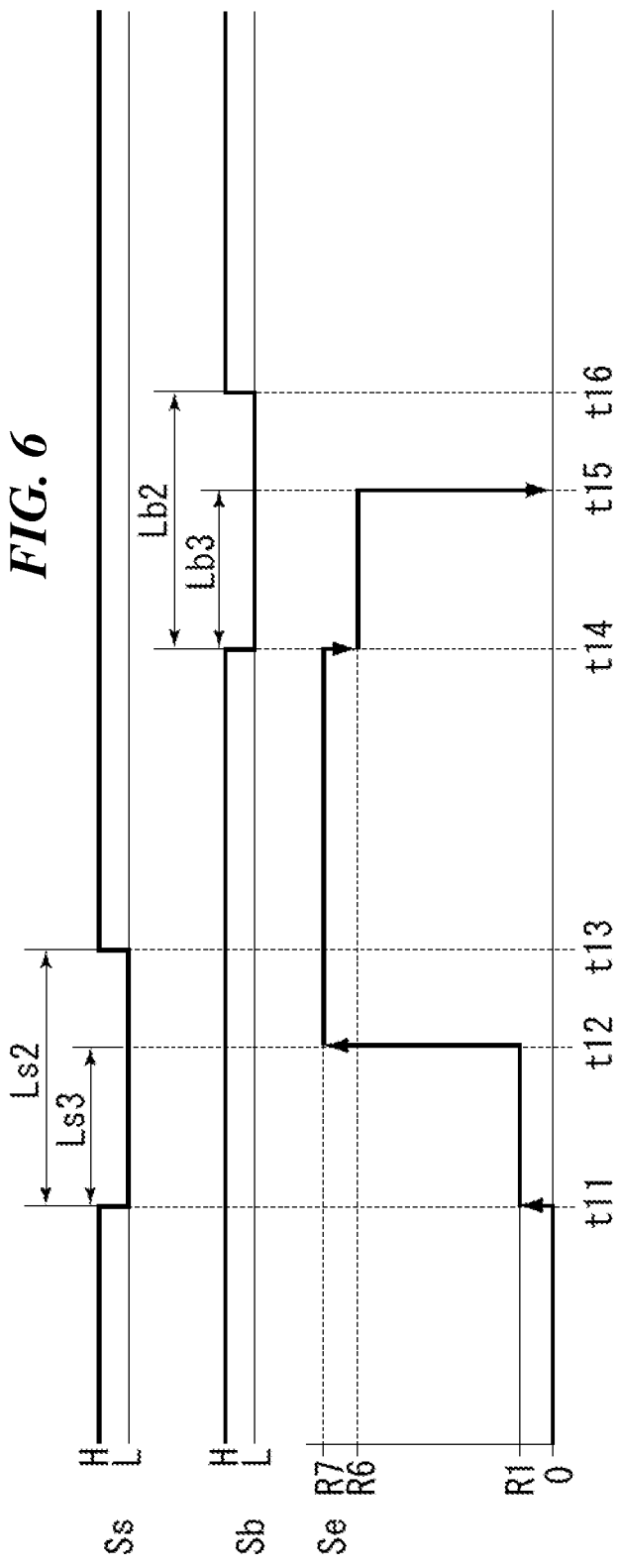
FIG. 6 is a diagram illustrating a target rotation speed signal output when the input duration time of the step command signal is equal to or greater than a predetermined time.

In FIGS. 5 and 6, the horizontal axis represents the change in time. In FIGS. 5 and 6, it is assumed that the total number of steps designated by the step number information D11 is seven. That is, the target rotation speed signal Se can have values of eight steps from 0 (corresponding to the stop of the motor 20) to R7. In FIGS. 5 and 6, it is assumed that both the step-up signal Ss and the step-down signal Sb are so-called low-active signals. The step command signals Ss and Sb are not limited to the low-active signals.

It is assumed that the target rotation speed signal Se is 0 and both the step command signals Ss and Sb are high (H) before time t1.

When the step-up signal Ss is changed to low (L) for a low time Ls1 which is shorter than a predetermined time at time t1 (when the press time Ls1 is shorter than the predetermined time), the command step is stepped up by one step (the command step is changed to a first step). Accordingly, the target rotation speed signal Se is changed to R1. The value of R1 corresponds to, for example, the initial step value of the step value information D12.

Thereafter, when the step-up signal Ss is respectively changed from high to low for a short time Ls1 from times t2, t3, t4, t5, t6, and t7, the command step is stepped up by one step every time (the command step is changed to the second step, the third step, the fourth step, the fifth step, the sixth step, and the seventh step). The value of the target rotation speed signal Se in each step is determined depending on the step width value, the initial step value, and the number of steps from the initial step which are determined by the step value information D12. At time t7, the target rotation speed signal Se is changed to the highest step R7 and the command step is not stepped up any more. At this time, the motor 20 is driven at the highest rotation speed. In the meantime, since the press time Ls1 is shorter than the predetermined time, the multistep-up signal C1 is not output from the multistep-up setting circuit 51. The changing of the command step is performed when the input of the step-up signal Ss is started.

When the target rotation speed signal Se is R7 at time t7 and the step-down signal Sb is changed to low for a low time Lb1 shorter than the predetermined time, the command step is stepped down by one step (the command step is changed to the sixth step at time t8). Accordingly, the target rotation speed signal Se is changed to R6. Thereafter, when the step-down signal Sb is respectively changed from high to low for the short time Lb1 from times t9, t10, t11, t12, t13, and t14, the command step is stepped down by one step every time. At time t13, the target rotation speed signal Se is changed to the initial step value R1 and the motor 20 is driven at the lowest rotation speed. At time t14, the target rotation speed signal Se is changed to 0 and the motor 20 is stopped. In the meantime, since the press time Lb1 is shorter than the predetermined time, the multistep-down signal C2 is not output from the multistep-down setting circuit 52. The changing of the command step is performed when the input of the step-down signal Sb is started.

In this way, by inputting the step command signals Ss and Sb by short press, the step of the target rotation speed signal Se can be accordingly changed and the rotation speed of the motor 20 can be stepwise changed. In FIG. 5, the step-up time and the step-down time are substantially the same time as changing the step command signals Ss and Sb to low and do not include a delay time, but a slight delay time occurs actually.

FIG. 6 is a diagram illustrating the target rotation speed signal Se output when the input duration time of the step command signals Ss and Sb is equal to or greater than a predetermined time.

In FIG. 6, the long press setting time (predetermined time) Ls3 for the step-up signal Ss and the long press setting time (predetermined time) Lb3 for the step-down signal Sb are illustrated together. It is determined whether to change the command step by plural steps depending on whether the input duration time of the step command signals Ss and Sb is shorter than the long press setting times Ls3 and Lb3.

As illustrated in FIG. 6, it is assumed that the target rotation speed signal Se is 0 and both the step command signals Ss and Sb are high before time t11.

When the step-up signal Ss is changed to low at time t11, the command step is stepped up by one step at this time. Accordingly, the target rotation speed signal Se is changed to R1. At this time, the multistep-up signal C1 is not output from the multistep-up setting circuit 51.

Thereafter, when the step-up signal Ss is continuously kept low up to time t12 at which the long press setting time Ls3 elapses after time t11, the multistep-up signal C1 is output from the multistep-up setting circuit 51. That is, by inputting the step-up signal Ss by long press, the multistep-up signal C1 is output. Accordingly, the step setting information generating circuit 53 outputs the step setting information C3 so as to step up the command step by six steps. Accordingly, the target rotation speed signal Se is changed to the highest step R7 and the motor 20 is driven at the highest rotation speed.

Thereafter, at time t13, the step-up signal Ss is changed from low to high. That is, the press time Ls2 at this time is from time t11 to time t13, which is longer than the long press setting time Ls3.

When the step-down signal Sb is changed to low at time t14, the command step is stepped down by one step at this time. Accordingly, the target rotation speed signal Se is changed from R7 to R6. At this time, the multistep-down signal C2 is not output from the multistep-down setting circuit 52.

Thereafter, when the step-down signal Sb is continuously kept low up to time t15 at which the long press setting time Lb3 elapses after time t14, the multistep-down signal C2 is output from the multistep-down setting circuit 52. That is, by inputting the step-down signal Sb by long press, the multi-step-down signal C2 is output. Accordingly, the step setting information generating circuit 53 outputs the step setting information C3 so as to step down the command step by six steps. Accordingly, the target rotation speed signal Se is changed to 0 and the motor 20 is stopped.

Thereafter, at time t16, the step-down signal Sb is changed from low to high. The press time Lb2 at this time is from time t14 to time t16, which is longer than the long press setting time Lb3.

In this way, by inputting the step command signals Ss and Sb by long press, the target rotation speed signal Se can be accordingly changed to the highest step R7 or 0 by smaller steps (two steps in this embodiment) and it is thus possible to greatly change the rotation speed of the motor 20.

When the step command signals Ss and Sb are changed from low to high to define the press time and the press time is longer than the long press setting time Ls3, the multistep command signals C1 and C2 may be output.

The number of steps of the command step changed when the multistep command signals C1 and C2 are output is not limited to the above-mentioned values. The target rotation speed signal Se may not be necessarily to the highest step or 0.

As described above, the following advantages can be achieved in this embodiment.

The setting of the target rotation speed signal Se can be changed to change the rotation speed of the motor 20 using two types of digital signals of the step-up signal Ss and the step-down signal Sb. Accordingly, it is possible to simplify the input of a command signal from the outside and thus to easily change the setting of the target rotation speed signal Se for the command signal.

The total number of steps, the initial step value, the step width value, and the like can be freely set depending on the setting information 38 stored in the memory 37. Accordingly, it is possible to easily change the range or method capable of setting the target rotation speed signal Se and thus to increase the degree of freedom in setting thereof. As a result, the motor drive controller 1 can easily handle a wide range of the total number of steps, the step width, and the like required for equipment in which the motor 20 is used.

Since the target rotation speed does not need to be designated by a signal that is externally input, it is not necessary to form an input terminal dedicated for the signal. The step-up signal Ss and the step-down signal Sb are input to the control circuit unit 3 using the start terminal and the brake terminal which are normally-used input terminals. In this way, since the step command signals Ss and Sb are input using the input terminals common to the start signal Ss and the brake signal Sb, it is not necessary to form a terminal dedicated for inputting the step command signals Ss and Sb and it is thus possible to reduce the number of terminals. Accordingly, it is possible to suppress an increase in manufacturing cost of the motor drive controller 1.

The step command signal shown in FIG. 5 or 6 are merely an exemplary sample, and various aspects can be applied as the operation of changing the target rotation speed signal Se depending on the press time.

For example, when the step-up signal Ss is input by long press, the command step is stepped up in two steps such as stepping up the command step of the target rotation speed signal Se up to the highest step after the command step is stepped up by one step. However, the present disclosure is not limited to this example, but the command step may be stepped up to the highest step as it is (in one step) when the step-up signal Ss is input by long press. Accordingly, it is possible to reduce the circuit size of the control circuit unit.

When the step command signals Ss and Sb are input by long press, the following operation may be performed. Accordingly, it is possible to simplify the circuit scale of the control circuit unit or to apply the motor drive controller 1 to various cases of use of the motor 20.

For example, when the step-down signal Sb is input by long press, the motor 20 may be controlled to be stopped in one step.

For example, when the step-down signal Sb is input by long press, the motor 20 may be driven at the target rotation speed corresponding to the target rotation speed signal R1 of the lowest speed, that is, the first step (the command step is the first step), instead of stopping the motor 20.

A degree of change (the changed command step value) when the command step is changed by plural steps may be changed, for example, depending on the length of the input duration time. For example, the command step may be changed by two steps when the long-press input is performed for one second, and the command step may be changed by four steps when the long-press input is performed for two seconds.

Second Embodiment

A basic configuration of a motor drive controller according to a second embodiment may be the same as that of the first embodiment and description for the similar parts and operation thereof will not be repeated. The second embodiment is different from the first embodiment, in that a signal path through which a rotation speed command signal is input from the outside in addition to the step command signal is formed.

Figure 7:
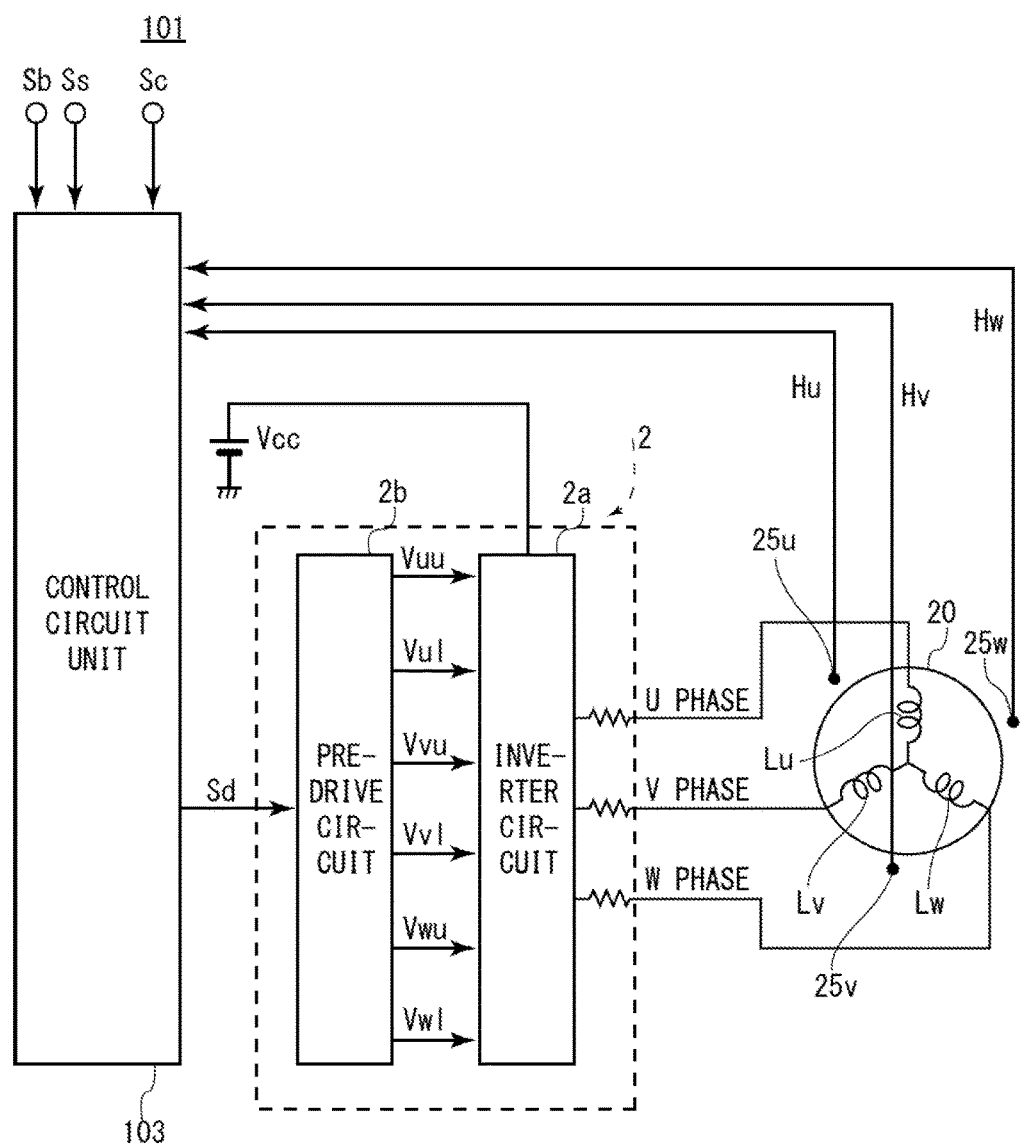
FIG. 7 is a diagram illustrating a circuit configuration of a motor drive controller according to a second embodiment of the invention.

FIG. 7 is a diagram illustrating a circuit configuration of a motor drive controller 101 according to the second embodiment of the invention.

As illustrated in FIG. 7, in the motor drive controller 101, a control circuit unit 103 having a slightly different configuration is formed instead of the control circuit unit 3 of the first embodiment. In the control circuit unit 103, a signal path through which a rotation speed command signal Sc is input is formed in addition to the signal path through which the start signal Ss and the brake signal Sb (or the step command signals Ss and Sb) are input.

The rotation speed command signal Sc is input, for example, from the outside of the control circuit unit 103. The rotation speed command signal Sc is a signal related to the rotation speed of the motor 20 and is, for example, a clock signal corresponding to a target rotation speed of the motor 20. In other words, the rotation speed command signal Sc is information corresponding to a target value of the rotation speed of the motor 20. A pulse-width modulation (PWM) signal may be input as the rotation speed command signal Sc.

Figure 8:
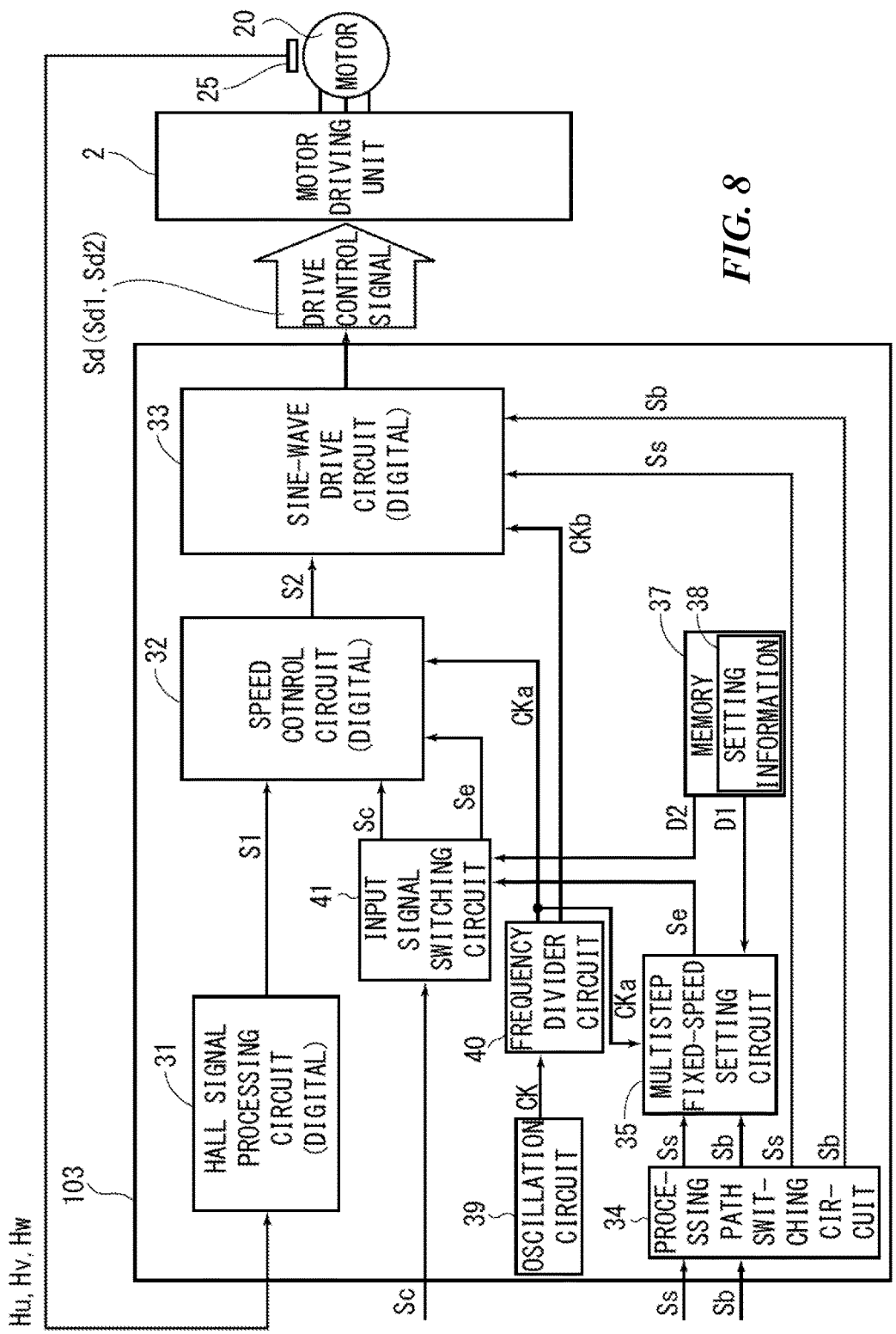
FIG. 8 is a block diagram illustrating a configuration of a control circuit unit according to the second embodiment.

FIG. 8 is a block diagram illustrating the configuration of the control circuit unit 103 according to the second embodiment.

As illustrated in FIG. 8, the control circuit unit 103 is additionally provided with an input signal switching circuit 41 in addition to the configuration of the control circuit unit 103. A target rotation speed signal Se output from the speed setting circuit 35 is input to the speed control circuit 32 via the input signal switching circuit 41.

The rotation speed command signal Sc, the target rotation speed signal Se, and a switching signal D2 input depending on the setting information 38 from the memory 37 are input to the input signal switching circuit 41. The setting information 38 includes information for designating a signal output from the input signal switching circuit 41 to the speed control circuit 32 in addition to the information stored in the first embodiment. The input signal switching circuit 41 outputs the signal corresponding to the switching signal D2 among the rotation speed command signal Sc and the target rotation speed signal Se to the speed control circuit 32.

In the second embodiment, by storing information in the memory 37, the rotation speed command signal Sc or the target rotation speed signal Se can be designated as the signal input to the speed control circuit 32. The speed control circuit 32 performs speed control based on the rotation speed command signal Sc or the target rotation speed signal Se input from the input signal switching circuit 41 and outputs speed command information S2. That is, the control circuit unit 103 determines whether to output a first drive control signal Sd1 (an example of the drive control signal Sd) based on the target rotation speed signal Se set in response to the step command signals Ss and Sb (first operation mode) or whether to output a second drive control signal Sd2 (an example of the drive control signal Sd) based on the rotation speed command signal Sc input from the outside (second operation mode) depending on the information stored in the memory 37. The first operation mode is an operation mode which is the same as the multistep operation mode in the first embodiment.

Figure 9:
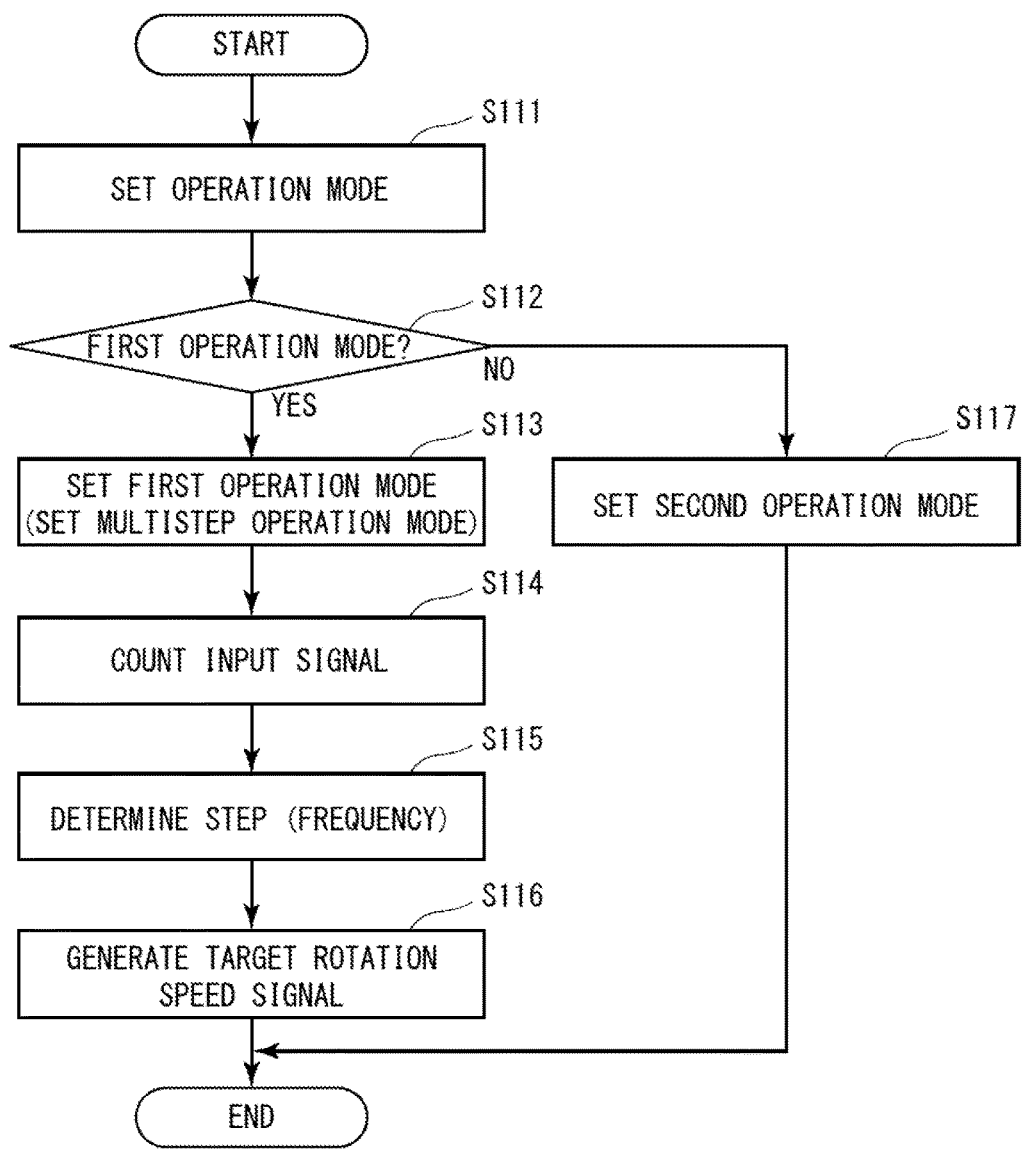
FIG. 9 is a flowchart illustrating an operation flow of the control circuit unit according to the second embodiment.

FIG. 9 is a flowchart illustrating an operation flow of the control circuit unit 103 according to the second embodiment.

As illustrated in FIG. 9, the operation mode is set in step S111. That is, the input signal switching circuit 41 acquires the switching information D2 based on the information stored in the memory 37.

In step S112, the input signal switching circuit 41 determines whether to operate in the first operation mode based on the switching information D2. That is, when the control circuit unit 103 operates in the first operation mode, the target rotation speed signal Se is output from the input signal switching circuit 41. On the other hand, when the control circuit unit 103 does not operate in the first operation mode, the rotation speed command signal Sc is output from the input signal switching circuit 41. In this case, the control circuit unit 103 operates in the second operation mode.

When it is determined in step S112 that the control circuit unit operates in the first operation mode, the operations of steps S113 to S116 are performed. These operations are performed in the same way as the operations of steps S101 to S104 in FIG. 4. As a result, the first drive control signal Sd1 is output form the control circuit unit 103.

On the other hand, when it is determined in step S112 that the control circuit unit does not operate in the first operation mode, the operation of step S117 is performed. That is, the control circuit unit 103 operates in the second operation mode and the speed control circuit 32 outputs the speed command information S2 based on the rotation speed command signal Sc input from the outside. As a result, the second drive control signal Sd2 is output from the control circuit unit 103.

In this way, in the second embodiment, since the control circuit unit 103 can determine whether to output the first drive control signal Sd1 based on the target rotation speed signal Se or whether to output the second drive control signal Sd2 based on the rotation speed command signal Sc, the motor drive controller 101 having the same configuration can be applied to equipment capable of outputting the rotation speed command signal Sc and to equipment that is not capable of outputting the rotation speed command signal Sc. Since the information is stored in the memory 37 the settings can be easily changed.

The control circuit unit 103 may determine whether to operate in the first operation mode or in the second operation mode depending on whether the command signal input from the outside is the step command signals Ss and Sb or the rotation speed command signal Sc, and may operate in the determined operation mode.

Others

The control circuit unit is not limited to the above-mentioned circuit configuration. The control circuit unit may have various circuit configurations which are suitable for the object of the present disclosure.

The setting information of the total number of steps, the initial step value, and the step width value can be arbitrarily designed. Accordingly, the motor drive controller can be widely applied to equipment with various specifications employing a motor. The step width value may be set such that the width may differ depending on the command step.

The above-mentioned flowchart is a specific example and the present disclosure is not limited to this flowchart. For example, another step may be inserted between the steps.

The setting information is not limited to information stored in the memory. Based on information acquired from the outside of the control circuit unit, the operation mode of the control circuit unit may be switched or the total number of steps, the step width value, the initial step value, and the like may be set.

The step-up signal and the step-down signal may not be input through the terminals common to the start signal or the brake signal. The step command signals may use terminals for other existing signals (such as the start signal and the brake signal) in common to suppress an increase in the number of terminals, or when there is one or more extra terminals, the extra terminals may be exclusively used for the step command signals. That is, only one of the step-up signal and the step-down signal may be used in common to the start signal or the brake signal, or both the step-up signal and the step-down signal may be input independently of the start signal or the brake signal.

In the above-mentioned embodiments, the step command signals are low-active signals, but are not limited to these signals and may be high-active signals.

The motor which is driven by the motor drive controllers according to the above-mentioned embodiments is not limited to a three-phase brushless motor. The number of Hall elements is not limited to three.

The method of detecting the rotation speed of the motor is not particularly limited. For example, the rotation speed may be detected using a counter-electromotive force of the motor instead of using the Hall elements.

The drive system of the motor is not limited to the sine-wave drive system. For example, a rectangular-wave drive system may be employed.

A part or all of the processes in the above-mentioned embodiments may be performed by software or may be performed by hardware circuits. That is, at least a part of the elements of the motor drive controller may be realized by the processes using software, not by the processes using hardware.

It should be understood that the above-mentioned embodiments are exemplary and are not intended to limit the scope in all respects. The scope of the invention is defined by the appended claims, not by the above-mentioned description, and includes all modifications within the concepts and scopes equivalent to the appended claims.

What is claimed is:

1. A motor drive controller comprising:
a control circuit unit configured to output a drive control signal for driving a motor in response to a command signal externally input to the control circuit unit, the command signal including a step command signal; and
a motor driving unit configured to output a drive signal to the motor based on the drive control signal output from the control circuit unit,
wherein the control circuit unit is provided with:
a memory that stores setting information including information for identifying a correspondence between preset multiple command steps and a target rotation speed of the motor for each of the preset multiple command steps:
a speed setting unit configured to:
receive the step command signal including a step-up signal for instructing stepping up a command step within the preset multiple command steps, and a step-down signal for instructing stepping down the command step within the preset multiple command steps;
determine a current command step based on the received step command signal;
determine the target rotation speed based on the current command step by referring to the setting information stored in the memory; and
generate a target rotation speed signal corresponding to the target rotation speed determined in response to referring to the setting information; and
a drive control signal generating unit configured to generate and output the drive control signal based on the target rotation speed signal.

2. The motor drive controller according to claim 1, wherein the setting information includes step number information corresponding to the total number of steps of the command step and step value information corresponding to an initial step value of a first command step and a step width value thereof.

3. The motor drive controller according to claim 2, wherein the speed setting unit is provided with:
a step setting information detecting circuit configured to receive the step command signal and the step number information and to output step setting information corresponding to the command step determined based on the step command signal; and
a target rotation speed generating circuit configured to output the target rotation speed signal based on the step setting information output from the step setting information detecting circuit.

4. The motor drive controller according to claim 3, wherein the step setting information detecting circuit is provided with a multistep command setting unit configured to output a multistep command signal which is instruction information for simultaneously stepping a plurality of steps when the step command signal is continuously input for a predetermined time period,
wherein the step setting information detecting circuit outputs the step setting information corresponding to the command step determined based on the multistep command signal when the multistep command setting unit outputs the multistep command signal.

5. The motor drive controller according to claim 3, wherein the target rotation speed generating circuit is provided with:
a dividing circuit configured to generate a frequency-division signal based on the step setting information and the step value information; and
a frequency divider circuit configured to generate and output the target speed signal based on the frequency-division signal generated by the dividing circuit.

6. The motor drive controller according to claim 1, wherein the step-up signal and the step-down signal are input to the control circuit unit through different signal lines.

7. The motor drive controller according to claim 6, wherein at least one of the step-up signal and the step-down signal also serves as one of a start signal and a brake signal which are used to control the motor.

8. The motor drive controller according to claim 1, wherein the control circuit unit is further provided with:
a signal path through which a rotation speed command signal for designating a rotation speed of the motor is input as the command signal; and
an input switching unit configured to input one of the target rotation speed signal generated from the control circuit unit based on the step command signal and the rotation speed command signal to the drive control signal generating unit, and
wherein the drive control signal generating unit generates and outputs the drive control signal based on the rotation speed command signal when the rotation speed command signal is input from the input switching unit.

9. A motor drive controller comprising:
a control circuit unit configured to output a drive control signal for driving a motor in response to a command signal externally input to the control circuit unit, the command signal including a step command signal; and
a motor driving unit configured to output a drive signal to the motor based on the drive control signal output from the control circuit unit,
wherein the control circuit unit is provided with:
a memory that stores setting information including information for identifying a correspondence between preset multiple command steps and a target rotation of the motor for each of the preset multiple command steps:
a first signal path through which the step command signal for performing control of stepwise designating a rotation speed of the motor is input as the command signal;
a second signal path through which a rotation speed command signal corresponding to the target rotation speed of the motor is input as the command signal; and
a speed setting unit configured to:
receive the step command signal including a step-up signal for instructing stepping up a command step within the preset multiple command steps, and a step-down signal for instructing stepping down the command step within the preset multiple command steps;
determine a current command step based on the received step command signal:
determine the target rotation speed based on the current command step by referring to the setting information stored in the memory; and
generate a target rotation speed signal corresponding to the target rotation speed determined in response to referring to the setting information,
wherein the control circuit unit generates and outputs the drive control signal based on the input signal when at least one of the step command signal and the rotation speed command signal is input.

10. A control method of a motor drive controller including: a control circuit unit configured to output a drive control signal for driving a motor in response to a command signal externally input to the control circuit unit, the command signal including a step command signal; and a motor driving unit configured to output a drive signal to the motor based on the drive control signal output from the control circuit unit, the control method comprising:

storing setting information including information for identifying a correspondence between preset multiple command steps and a target rotation of the motor for each of the preset multiple command steps;

receiving an input of the step command signal for performing stepwise control to set a rotation speed of the motor as the command signal to the control circuit unit;

receiving an input of a rotation speed command signal corresponding to the target rotation speed of the motor as the command signal to the control circuit unit;

receiving the step command signal including a step-up signal for instructing stepping up a command step within the preset multiple command steps, and a step-down signal for instructing stepping down the command step within the preset multiple command steps;

determining a current command step based on the received step command signal;

determining the target rotation speed based on the current command step by referring to the setting information;

generating a target rotation speed signal corresponding to the target rotation speed determined in response to referring to the setting information; and generating and outputting the drive control signal based on the step command signal or the rotation speed command signal when at least one of the step command signal and the rotation speed command signal is received.

* * * * *